(12) United States Patent
Hutton

(10) Patent No.: US 7,603,735 B2
(45) Date of Patent: Oct. 20, 2009

(54) SYSTEM AND METHOD FOR WIRELESS COMMUNICATION BETWEEN AN AIRCRAFT AND A PASSENGER BOARDING BRIDGE

(75) Inventor: Neil Hutton, Ottawa (CA)

(73) Assignee: DEW Engineering and Development ULC, Ottawa, Ontario (CA)

(*) Notice: Subject to any disclaimer, the term of this patent is extended or adjusted under 35 U.S.C. 154(b) by 689 days.

(21) Appl. No.: 11/373,976

(22) Filed: Mar. 14, 2006

(65) Prior Publication Data
US 2007/0214583 A1 Sep. 20, 2007

(51) Int. Cl.
E01D 1/00 (2006.01)
G08G 5/00 (2006.01)

(52) U.S. Cl. ........................ 14/71.5; 340/958
(58) Field of Classification Search ......... 14/69.5–71.5; 340/958
See application file for complete search history.

(56) References Cited

U.S. PATENT DOCUMENTS 6,117,073 A * 9/2000 Jones et al. ................. 600/300
6,637,063 B1 10/2003 Hutton et al.
6,742,210 B2 6/2004 Hutton et al.
6,757,927 B2 7/2004 Hutton et al.
6,907,635 B2 6/2005 Hutton et al.

OTHER PUBLICATIONS

U.S. Appl. No. 11/157,934, Hutton.
U.S. Appl. No. 11/157,938, Hutton.
U.S. Appl. No. 11/149,401, Hutton.
U.S. Appl. No. 11/155,502, Hutton.
U.S. Appl. No. 11/589,754, Hutton.
U.S. Appl. No. 11/519,968, Hutton.

* cited by examiner

Primary Examiner—Raymond W Addie
(74) Attorney, Agent, or Firm—Freedman & Associates

(57) ABSTRACT

A method for wireless communication between an aircraft and a passenger boarding bridge includes assigning an aircraft to a parking space adjacent to the passenger boarding bridge. The aircraft includes a signal-transmitting module for use in automated bridge alignment operations and has a unique aircraft identifier code associated therewith. The step of assigning includes providing the unique aircraft identifier code to an automated bridge alignment system of the passenger boarding bridge. Signals transmitted between the aircraft and the passenger boarding bridge are encoded with the unique aircraft identifier code for transmission between the aircraft and the automated bridge alignment system.

19 Claims, 4 Drawing Sheets

SYSTEM AND METHOD FOR WIRELESS COMMUNICATION BETWEEN AN AIRCRAFT AND A PASSENGER BOARDING BRIDGE

FIELD OF THE INVENTION

The instant invention relates generally to aircraft passenger boarding bridges, and more particularly to a system and method for wireless communication between an aircraft and a passenger boarding bridge during an automated alignment operation.

BACKGROUND

In order to make aircraft passengers comfortable, and in order to transport them between an airport terminal building and an aircraft in such a way that they are protected from the weather and from other environmental influences, passenger boarding bridges are used which are telescopically extensible and the height of which is adjustable. For instance, an apron drive bridge in present day use includes a plurality of adjustable modules, including: a rotunda, a telescopic tunnel, a bubble section, a cab, and elevating columns with wheel carriage. Other common types of passenger boarding bridges include radial drive bridges and over-the-wing (OTW) bridges. These types of passenger boarding bridges are adjustable, for instance to compensate for different sized aircraft and to compensate for imprecise parking of aircraft at an airport terminal. Manual, semi-automated and fully-automated bridge alignment systems are known for adjusting the position of the passenger boarding bridge relative to an aircraft, for instance to compensate for different sized aircraft and to compensate for imprecise parking of aircraft.

A manual bridge alignment system requires that a human operator is present to perform the alignment operation each time an aircraft arrives. Delays occur when the human operator is not standing-by to perform the alignment operation as soon as the aircraft comes to a stop. In addition, human operators are prone to errors that result in the passenger boarding bridge being driven into the aircraft or into a piece of ground service equipment. Such collisions involving the passenger boarding bridge are costly and also result in delays. In order to avoid causing a aircraft wirelessly transmits a call signal for initiating an automated alignment operation of a passenger boarding bridge, it is possible that one or more neighboring passenger boarding bridges may intercept and act upon the call signal as well. In this case, an aircraft may inadvertently initiate automated docking of more than one passenger boarding bridge at time. As a result, the neighboring bridges may collide with aircraft or ground service equipment located adjacent thereto, particularly since the bridge movement is sudden and unexpected. Similarly, control signals and/or confirmation signals that are exchanged between an aircraft and an assigned passenger boarding bridge may be intercepted and acted upon by other passenger boarding bridges in close proximity to the assigned passenger boarding bridge. With the growing number of automated bridge alignment systems that are in use at airports, the problem of cross-talk related bridge incidents is becoming more of a concern.

It would be advantageous to provide a system and method that overcomes at least some of the above-mentioned limitations of the prior art.

SUMMARY OF EMBODIMENTS OF THE INVENTION

It is an object of at least one embodiment of the instant invention to support, during a current docking operation, secure communication between an aircraft and a control system of an automated passenger boarding bridge with which the aircraft is to be docked.

In accordance with an aspect of the instant invention there is provided a method for aligning an aircraft-engaging end of a passenger boarding bridge to a doorway of an aircraft, the passenger boarding bridge selected from a plurality of passenger boarding bridges at an airport terminal building and having an aircraft parking space defined adjacent thereto, the method comprising: assigning to the aircraft parking space an aircraft having a unique aircraft identifier code associated therewith, the aircraft including a signal-transmitting module for use in automated bridge alignment operations, wherein assigning comprises providing the unique aircraft identifier code to an automated bridge alignment system of the passenger boarding bridge; waiting for the aircraft to park within the parking space; and, encoding a signal with the unique aircraft identifier code for transmission between the aircraft and the automated bridge alignment system.

In accordance with another aspect of the instant invention there is provided a method for aligning an aircraft-engaging end of a passenger boarding bridge to a doorway of an aircraft, the aircraft having a unique aircraft identifier code associated therewith and including a signal-transmitting module for use in automated bridge alignment operations, the passenger boarding bridge selected from a plurality of passenger boarding bridges at an airport terminal building and having an aircraft parking space defined adjacent thereto, the method comprising: retrieving, from a memory element of the airport terminal building, the unique identifier code relating to the aircraft; providing the retrieved unique identifier code to an automated bridge alignment system of the passenger boarding bridge; using a receiver disposed at a location that is remote from the aircraft, receiving a signal transmitted wirelessly from the aircraft; using a processor in communication with the receiver, determining whether the received signal includes information that is indicative of the retrieved unique aircraft identifier code; and, in dependence upon the received signal including information that is indicative of the retrieved unique aircraft identifier code, processing the received signal as a signal for aligning the aircraft-engaging end of the passenger boarding bridge to the doorway of the aircraft.

In accordance with another aspect of the instant invention there is provided a method for aligning an aircraft-engaging end of a passenger boarding bridge to a doorway of an aircraft, the aircraft including a signal-transmitting module for use in automated bridge alignment operations, the passenger boarding bridge selected from a plurality of passenger boarding bridges at an airport terminal building and having an aircraft parking space defined adjacent thereto, the method comprising: assigning a unique aircraft identifier code to the aircraft; storing data relating to the unique aircraft identifier code within a memory element of the aircraft, the memory element in communication with the signal-transmitting module; storing data relating to the unique aircraft identifier code separately within a memory element of the airport terminal building; assigning the aircraft to park within the aircraft parking space during a current alignment operation, wherein assigning includes providing the unique aircraft identifier code from the memory element of the airport terminal building to an automated bridge alignment system of the passenger boarding bridge; transmitting a signal from the aircraft to a receiver that is disposed at a location remote from the aircraft, the signal encoded using the data relating to the unique aircraft identifier code; processing the signal to determine whether it is encoded using the data relating to the unique aircraft identifier code; and, if the signal is encoded using the data relating to the unique aircraft identifier code, performing an action for aligning the aircraft-engaging end of the passenger boarding bridge to the doorway of the aircraft.

In accordance with another aspect of the instant invention there is provided a system for aligning an aircraft-engaging end of a passenger boarding bridge to a doorway of an aircraft, the passenger boarding bridge selected from a plurality of passenger boarding bridges at an airport terminal building and having an aircraft parking space defined adjacent thereto, the system comprising: a memory element disposed aboard the aircraft for retrievably storing a unique identifier code of the aircraft; a processor in communication with the memory element for encoding a signal with the unique identifier code; and, a transmitter in communication with the processor for wirelessly transmitting the signal encoded with the unique identifier code.

BRIEF DESCRIPTION OF THE DRAWINGS

Exemplary embodiments of the invention will now be described in conjunction with the following drawings, in which similar reference numbers designate similar items.

DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
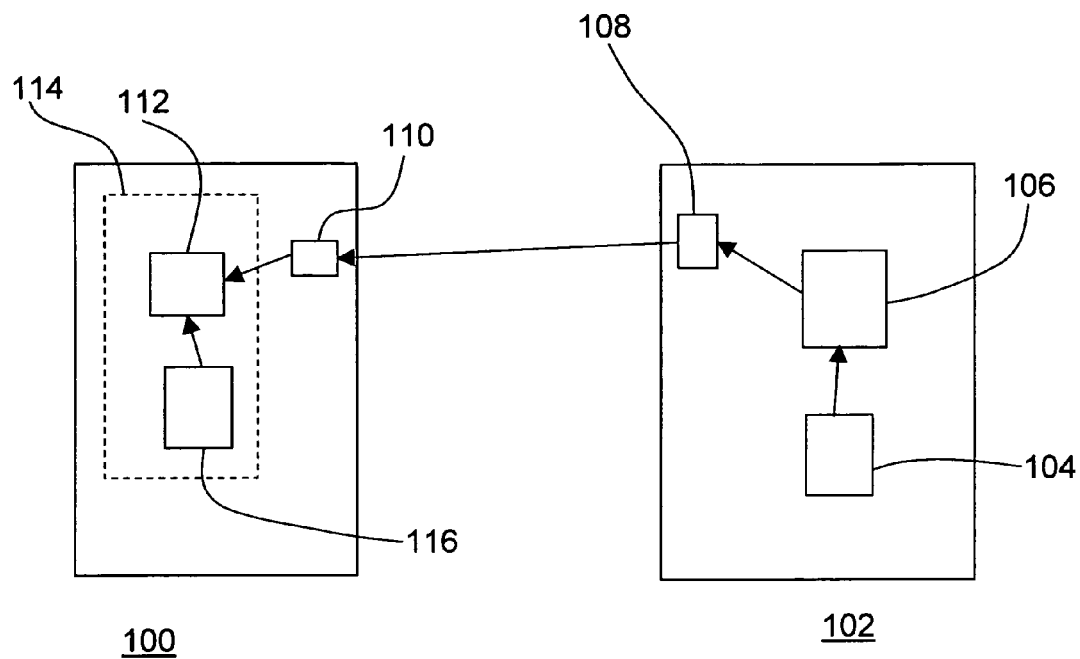
FIG. 1 is a simplified block diagram of a system for aligning an aircraft-engaging end of a passenger boarding bridge to a doorway of an aircraft, according to an embodiment of the instant invention.

Referring to FIG. 1, shown is a simplified block diagram of a system for aligning an aircraft-engaging end of a passenger boarding bridge to a doorway of an aircraft, according to an embodiment of the instant invention. For instance, the passenger boarding bridge is selected from a plurality of automated passenger boarding bridges at an airport terminal building, and has an aircraft parking space defined adjacent thereto. The system includes components shown generally at 100, which are disposed at a location that is remote from the aircraft, and components shown generally at 102, which are disposed aboard the aircraft. By way of a non-limiting example, the components 100 are disposed near the aircraft-engaging end of the passenger boarding bridge, and the components 102 are disposed in a cockpit area of the aircraft. The components 102 that are disposed aboard the aircraft include a memory element 104 for retrievably storing a unique identifier code of the aircraft, a processor 106 in communication with the memory element 104 for encoding a signal with the unique identifier code, and a transmitter 108 in communication with the processor 106 for wirelessly transmitting the signal that is encoded with the unique identifier code. The components 100 disposed at the location that is remote from the aircraft include a receiver 110 for receiving the transmitted encoded signal, and a processor 112, such as for instance a processor of an automated bridge controller 114, in communication with the receiver 110 for processing the received signal and for determining whether it is encoded using the unique identifier code. A memory storage element 116 is also provided in communication with the processor 112, for storing information relating to unique aircraft identifier codes and other data. Optionally, the components 102 include a not illustrated user interface in communication with the processor 106, for receiving from a user an input signal relating to a current alignment operation and for providing an output signal relating thereto. Input signals such as "initiate alignment," "extend bridge," "raise cab," and "stop bridge movement" are provided as just a few non-limiting examples of signals that are encoded according to the instant embodiment.

By way of a non-limiting example, the unique identifier code for the aircraft is provided in the form of a string of alphanumeric characters. The string is sufficiently long to support assignment of a unique identifier code for each different aircraft having a signal-transmitting module for use in automated bridge alignment operations. Optionally, unique identifier codes are assigned to aircraft in a pseudo-random or sequential fashion. Alternatively, the unique identifier codes are assigned in a manner that serves to at least partially identify the aircraft, such as for instance the type or sub-type of aircraft and/or the identity of the airline that flies the aircraft, etc.

During use, each signal is encoded with the unique identifier code prior to being transmitted from the aircraft to the passenger boarding bridge. A signal that is encoded with the unique identifier code encompasses a signal that includes only the unique identifier code, or a signal that includes information relating to a bridge alignment command in addition to the unique identifier code, or a signal that includes information relating to a bridge alignment command and that is encrypted using the unique identifier code as the encryption key.

Since gate assignments are determined in advance, the unique identifier code for the aircraft optionally is provided to the automated bridge alignment system prior to the aircraft actually arriving at the gate. For instance, the correct unique identifier code for a current alignment operation is retrieved from a centralized database of the airport terminal building and is provided to the automated bridge alignment system, where it is retrievably stored within memory storage element 116. Each signal that is received by receiver 110 is first processed by processor 112 to determine whether it is encoded with the unique identifier code. If a signal is encoded with the correct unique identifier code for a current alignment operation, then the automated bridge alignment system acts upon that signal. However, if a signal is not encoded with the correct unique identifier code for a current alignment operation, then the automated bridge alignment system does not act upon that signal. This ensures that the automated bridge alignment system of the passenger boarding bridge responds only to signals that are transmitted from an aircraft that is actually assigned to that passenger boarding bridge.

Alternatively, the aircraft itself transmits the unique identifier code to the automated bridge alignment system. In this case, gate assignment information is provided to the automated bridge alignment system of a passenger boarding bridge prior to the aircraft arriving at the bridge. The gate assignment information includes airline identity and aircraft type or sub-type information, but not specifically the unique identifier code for the aircraft. Upon receiving the unique identifier code from the aircraft, the automated bridge alignment system extracts the airline and aircraft type or sub-type information from the code for comparison to the gate assignment information. Provided that the comparison is indicative of matching information, the automated bridge alignment system enters a mode of operation for receiving additional signals that are encoded with the same unique identifier code. Advantageously, another nearby passenger loading bridge is unlikely to have a similar aircraft type assigned thereto at precisely the same time. Accordingly, even if an automated bridge alignment system of the other nearby passenger boarding bridge "overhears" the signal from the aircraft, the processor is unable to determine a match and the automated bridge alignment system is therefore prevented from entering a mode of operation for receiving additional signals from the aircraft.

Some non-limiting examples of signals that are transmitted from the aircraft to the automated bridge alignment system are provided herein below, in order to facilitate a better understanding of the instant embodiment of the invention. For instance, some automated bridge alignment systems require the aircraft to transmit a call signal when it approaches the parking space that is adjacent the passenger boarding bridge. The call signal is for activating the automated bridge alignment system from a standby state and/or for initiating an automated bridge alignment operation. Encoding the call signal with the unique aircraft identifier code ensures that the aircraft is able to call only for the passenger boarding bridge to which it has been assigned. Optionally, the encoded call signal includes only the unique aircraft identifier code. In this case, transmitting the call signal is accomplished simply by transmitting the unique aircraft identifier code from the aircraft to the automated bridge alignment system. Additionally, some automated bridge alignment systems require the aircraft to transmit command signals for moving the passenger boarding bridge toward the aircraft. Encoding the command signals ensures that the aircraft is able to control only the passenger boarding bridge to which it has been assigned.

Encoding signals with the unique aircraft identifier optionally includes encrypting the signals using the unique aircraft identifier, such that only an automated bridge alignment system that is in possession of the correct unique aircraft identifier is capable of decrypting the encrypted signal. Automated bridge alignment systems of other, nearby passenger boarding bridges may receive the encrypted signals, but are incapable of decrypting the same. Alternatively, the encoded signal merely contains the unique aircraft identifier. For instance, the unique aircraft identifier is attached to the beginning or the end of each message. Optionally, the encoded signal contains only the unique aircraft identifier.

Figure 2:
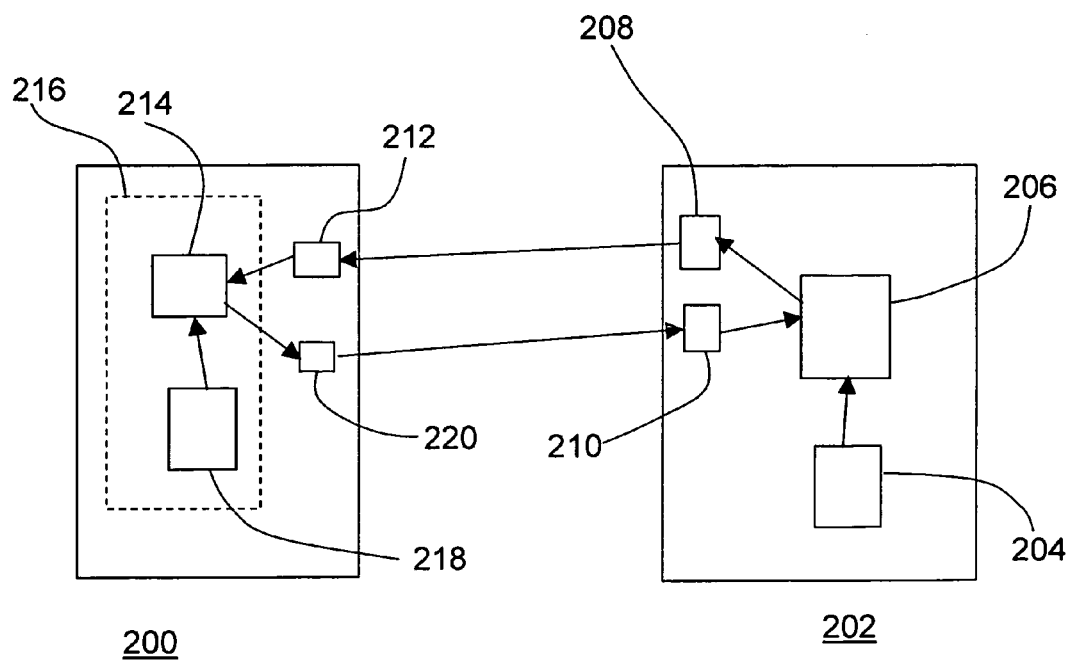
FIG. 2 is a simplified block diagram of another system for aligning an aircraft-engaging end of a passenger boarding bridge to a doorway of an aircraft, according to an embodiment of the instant invention.

Referring now to FIG. 2, shown is a simplified block diagram of another system for aligning an aircraft-engaging end of a passenger boarding bridge to a doorway of an aircraft, according to an embodiment of the instant invention. For instance, the passenger boarding bridge is selected from a plurality of automated passenger boarding bridges at an airport terminal building, and has an aircraft parking space defined adjacent thereto. The system includes components shown generally at 200, which are disposed at a location that is remote from the aircraft, and components shown generally at 202, which are disposed aboard the aircraft. By way of a non-limiting example, the components 200 are disposed near the aircraft-engaging end of the passenger boarding bridge, and the components 202 are disposed in a cockpit area of the aircraft. The components 202 that are disposed aboard the aircraft include a memory element 204 for retrievably storing a unique identifier code of the aircraft, a processor 206 in communication with the memory element 204 for encoding a signal with the unique identifier code, a transmitter 208 in communication with the processor 206 for wirelessly transmitting the signal that is encoded with the unique identifier code, and a receiver 210 in communication with the processor 206 for receiving wirelessly transmitted signals and for providing the signals to the processor 206. The components 200 disposed at the location that is remote from the aircraft include a receiver 212 for receiving the transmitted encoded signal, a processor 214, such as for instance a processor of an automated bridge controller 216, which is in communication with the receiver 212 for processing the received signal and for determining whether it is encoded using the unique identifier code, a memory storage element 218 in communication with the processor 216, and a transmitter 220 also in communication with the processor. Optionally, the components 202 include a not illustrated user interface in communication with the processor 206, for receiving from a user an input signal relating to a current alignment operation and for providing an output signal relating thereto. Input signals such as "initiate alignment," "extend bridge," "raise cab," and "stop bridge movement" are provided as just a few non-limiting examples of signals that are encoded according to the instant embodiment.

The system that is shown in FIG. 2 supports two-way communication between the aircraft and the passenger boarding bridge. Signals transmitted from the aircraft to the automated bridge alignment system are encoded with the unique aircraft identifier code, as discussed supra. In addition, each passenger boarding bridge optionally is assigned a unique bridge identifier code, which is stored in memory storage element 218. During alignment of a passenger boarding bridge to an aircraft, signals that are transmitted from the automated bridge alignment system of the passenger boarding bridge to the aircraft are encoded with the unique bridge identifier. The processor 206 aboard the aircraft determines whether each received signal includes an expected unique bridge identifier. In this way, it is possible to determine if more than one automated bridge alignment system is responding to signals being transmitted from the aircraft. It is also possible for the aircraft to "ignore" signals that are transmitted from other nearby passenger boarding bridges.

Alternatively, signals transmitted from the aircraft to the automated bridge alignment system are encoded with the unique aircraft identifier code, as discussed supra. However, instead of a unique bridge identifier the same unique aircraft identifier code is attached to messages that are sent from the automated bridge alignment system to the aircraft. Optionally, the signals are encrypted using the unique aircraft identifier code. Accordingly, only the aircraft that is associated with the unique aircraft identifier code acts upon the transmitted signals.

Optionally, the automated bridge alignment system appends additional data to the encoded signal. For instance, during an alignment operation the automated bridge alignment system receives a plurality of encoded command signals from the aircraft. Prior to executing each command, the automated bridge alignment system transmits to the aircraft a confirmation signal including appended sequence data. If the processor 206 aboard the aircraft determines an error in the sequence data, then an encoded abort signal is transmitted for aborting the alignment operation prior to a collision occurring. Optionally, an encoded corrective signal is transmitted to the automated bridge alignment system, which does not result in the alignment operation being aborted.

Figure 3:
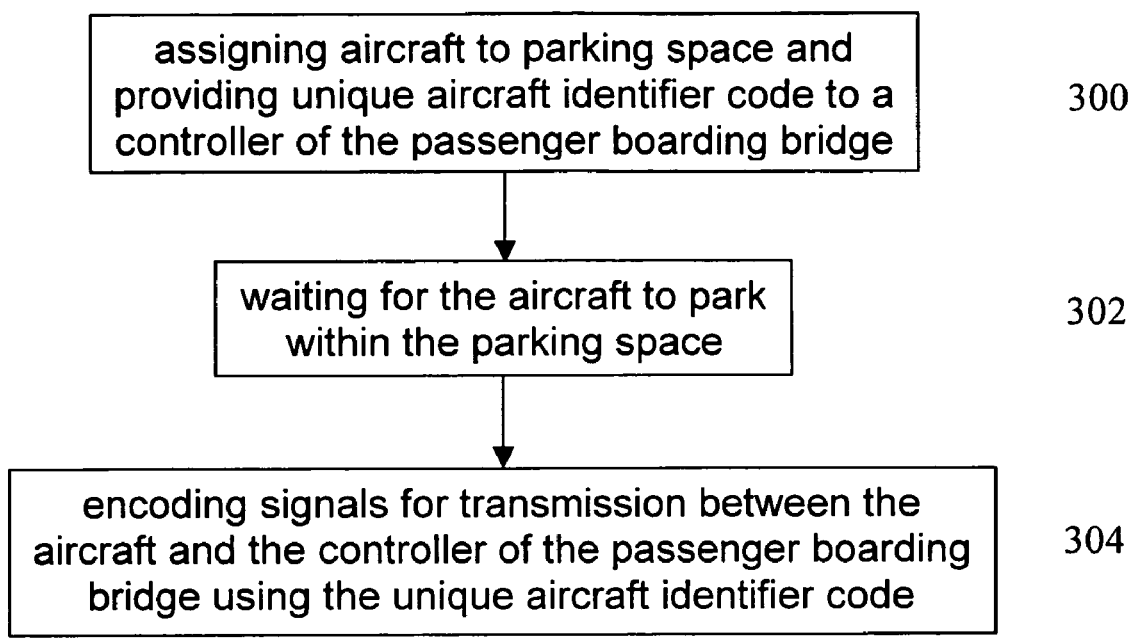
FIG. 3 is a simplified flow diagram of a method for aligning an aircraft-engaging end of a passenger boarding bridge to a doorway of an aircraft, according to an embodiment of the instant invention.

Referring now to FIG. 3, shown is a simplified flow diagram of a method for aligning an aircraft-engaging end of a passenger boarding bridge to a doorway of an aircraft, according to an embodiment of the instant invention. For instance, the passenger boarding bridge is selected from a plurality of passenger boarding bridges at an airport terminal building, and has an aircraft parking space defined adjacent thereto. At step 300 an aircraft having a signal-transmitting module for use in automated bridge alignment operations is assigned to the aircraft parking space adjacent to the passenger boarding bridge. The aircraft has a unique aircraft identifier code, which is stored in a memory element of the signal-transmitting module. Assigning the aircraft to the parking space adjacent to the passenger boarding bridge includes providing information relating to the aircraft from a database of the terminal building to an automated bridge alignment system of the passenger boarding bridge. The provided information includes the unique aircraft identifier code. Optionally, additional information is provided, such as for instance the expected time of arrival, flight number, etc. Optionally, the provided information includes the type or sub-type of the aircraft. Alternatively, aircraft type or sub-type information is determined using sensors that are in communication with the automated bridge alignment system, or the aircraft type or sub-type information is transmitted from the aircraft when it arrives within the parking space. Optionally, the unique aircraft identifier code contains information relating to the aircraft type and/or sub-type. At step 302, the automated bridge alignment system waits for the aircraft to park within the parking space. At step 304 signals are encoded using the unique identifier code for transmission between the aircraft and the automated bridge alignment system, the encoded signals for use in performing an automated alignment of the passenger boarding bridge to a doorway of the aircraft.

Encoding the signals at step 304 encompasses providing a signal that includes only the unique aircraft identifier code. Optionally, encoding the signals at step 304 is performed by attaching the unique aircraft identifier code to each signal that is transmitted between the aircraft and the automated bridge alignment system. Further optionally, encoding the signals at step 304 includes encrypting each signal using the unique aircraft identifier code as an encryption key. Since the purpose of encrypting is merely to ensure that signals are identifiable by their intended recipient, relatively weak encryption algorithms may be used. Furthermore, symmetric encryption schemes may be used since the automated bridge control system is provided in advance with the unique aircraft identifier code. Various algorithms for encrypting data are known, and one skilled in the art will readily select a particular algorithm that is suitable for encrypting signals for transmission between the aircraft and the automated bridge alignment system. Further optionally, encoding the signals at step 304 includes digitally signing the signal using the unique aircraft identifier code. Optionally, a time-stamp of the time of transmission of the digitally signed signal is added. In the event a bridge collision occurs, the time-stamp data provides information that may be helpful in determining a cause of the collision.

Figure 4:
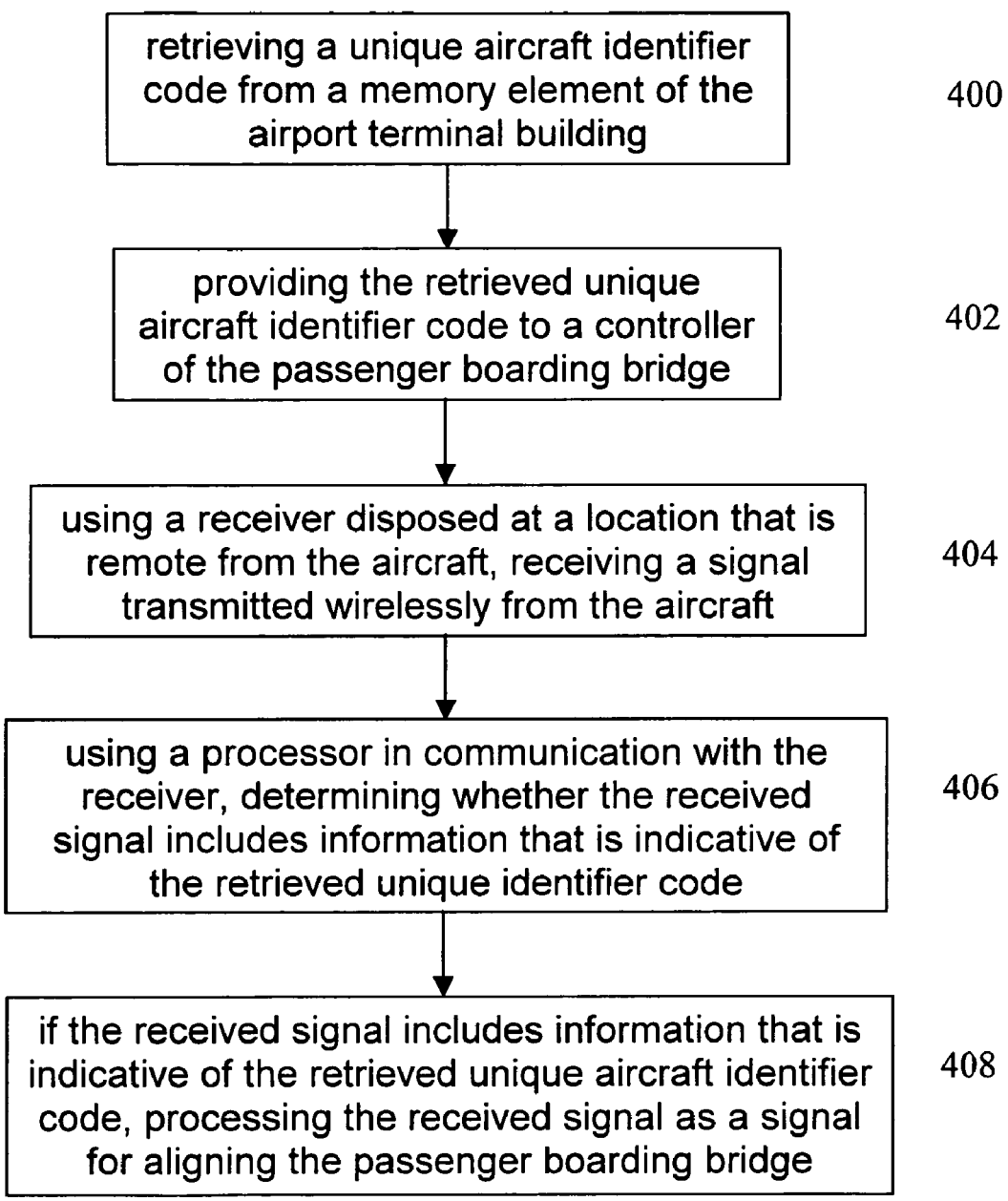
FIG. 4 is a simplified flow diagram of another method for aligning an aircraft-engaging end of a passenger boarding bridge to a doorway of an aircraft, according to an embodiment of the instant invention; and, FIG. 5 is a simplified flow diagram of another method for aligning an aircraft-engaging end of a passenger boarding bridge to a doorway of an aircraft, according to an embodiment of the instant invention.

Referring now to FIG. 4, shown is a simplified flow diagram of another method for aligning an aircraft-engaging end of a passenger boarding bridge to a doorway of an aircraft, according to an embodiment of the instant invention. For instance, the passenger boarding bridge is selected from a plurality of passenger boarding bridges at an airport terminal building, and has an aircraft parking space defined adjacent thereto. The aircraft has a signal-transmitting module for use in automated bridge alignment operations, the signal transmitting-module in communication with a memory element for storing a unique aircraft identifier code. At step 400 the unique aircraft identifier code relating to the aircraft is retrieved from a memory storage location of the airport terminal building, such as for instance a centralized database. At step 402 the unique aircraft identifier code is provided to an automated bridge alignment system of the passenger boarding bridge, for instance as part of assigning the aircraft to that passenger boarding bridge. At step 404 a receiver that is disposed at a location remote from the aircraft is used to receive a wirelessly transmitted signal from the aircraft. For instance, the receiver is disposed on or about the passenger boarding bridge. At step 406, the received signal is provided to a processor of the automated bridge alignment system and a determination is made whether the received signal includes information that is indicative of the retrieved unique aircraft identifier code. If the received signal does include information that is indicative of the retrieved unique aircraft identifier code, then at step 408 the received signal is processed as a signal for aligning the aircraft-engaging end of the passenger boarding bridge to the doorway of the aircraft. Of course, if the received signal does not include information that is indicative of the retrieved unique aircraft identifier code, then the signal is ignored.

Figure 5:
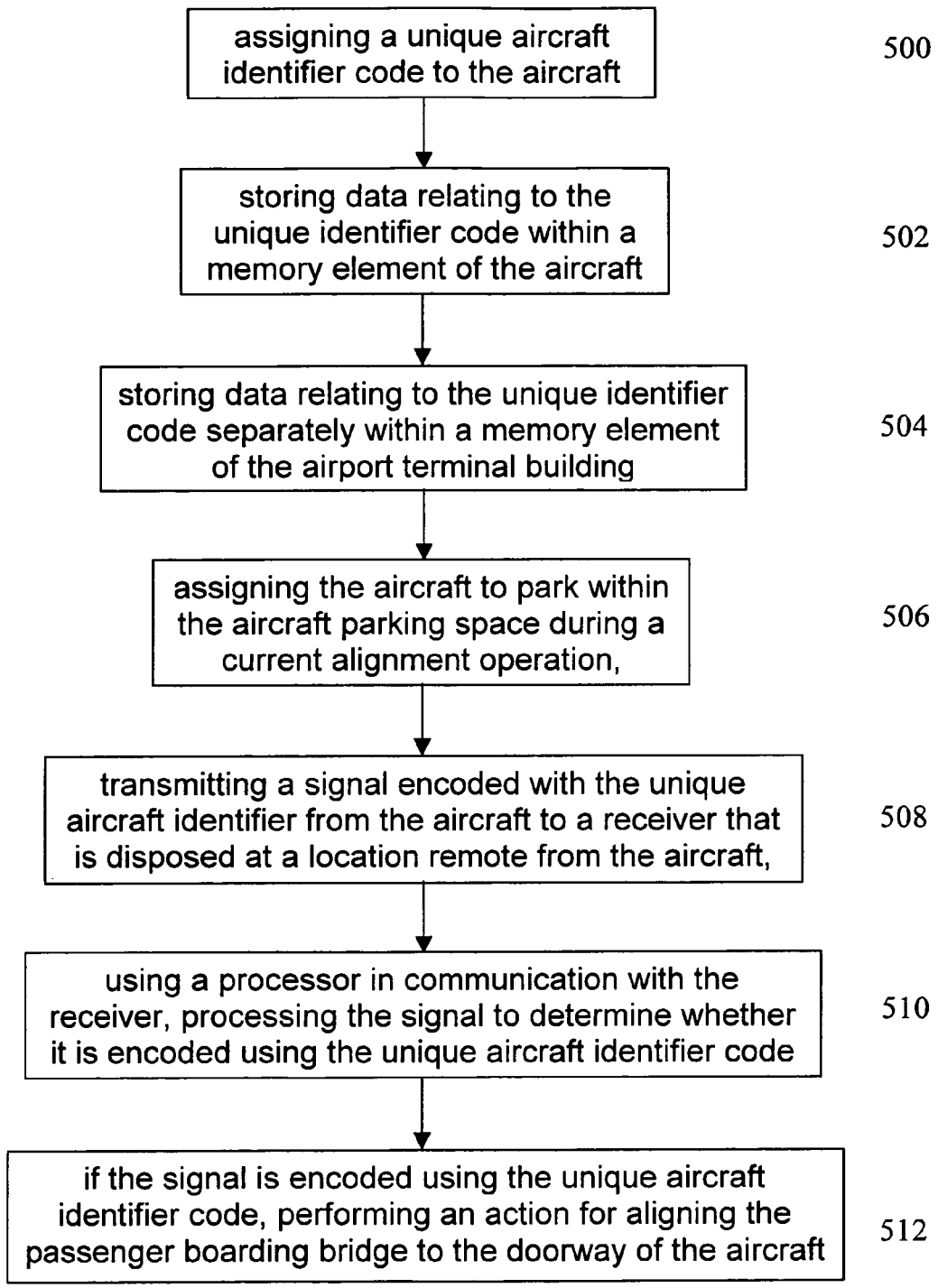

Referring now to FIG. 5, shown is a simplified flow diagram of another method for aligning an aircraft-engaging end of a passenger boarding bridge to a doorway of an aircraft, according to an embodiment of the instant invention. For instance, the passenger boarding bridge is selected from a plurality of passenger boarding bridges at an airport terminal building, and has an aircraft parking space defined adjacent thereto. The aircraft has a signal-transmitting module for use in automated bridge alignment operations, the signal transmitting-module in communication with a memory element for storing a unique aircraft identifier code. At step 502 a unique aircraft identifier code is assigned to the aircraft. Optionally, step 502 is performed during aircraft manufacture, as part of an aftermarket retrofit. In particular, step 502 includes storing data relating to the unique identifier code within the memory element of the aircraft. At step 504, data relating to the unique identifier code is stored separately within a memory element of the airport terminal building. At step 506 the aircraft is assigned to park within the aircraft parking space adjacent to the passenger boarding bridge, during a current alignment operation. Assigning the aircraft to the parking space adjacent to the passenger boarding bridge includes providing information relating to the aircraft from a database of the terminal building to an automated bridge alignment system of the passenger boarding bridge. The provided information includes the unique aircraft identifier code. Optionally, additional information is provided, such as for instance the expected time of arrival, flight number, etc. Optionally, the provided information includes the type or sub-type of the aircraft. Alternatively, aircraft type or sub-type information is determined using sensors that are in communication with the automated bridge alignment system, or the aircraft type or sub-type information is transmitted from the aircraft when it arrives within the parking space. Optionally, the unique aircraft identifier code contains information relating to the aircraft type and/or sub-type. At step 508 a signal relating to an automated bridge alignment action is transmitted wirelessly from the aircraft to a receiver that is disposed at a location remote from the aircraft. In particular, the signal is encoded using the unique identifier code. At step 510 a processor in communication with the receiver is used to process the signal, in order to determine whether it is encoded using the unique identifier code. At step 512, if the signal is encoded using the unique identifier code, the automated bridge alignment system performs the automated bridge alignment action.

Optionally, the signal relating to an automated bridge alignment action is encoded by attaching the unique aircraft identifier code thereto. Further optionally, the signal relating to an automated bridge alignment action is encoded by encrypting using the unique aircraft identifier code as an encryption key. Since the purpose of encrypting is merely to ensure that signals are identifiable by their intended recipient, relatively weak encryption algorithms may be used. Furthermore, symmetric encryption schemes may be used since the automated bridge control system is provided in advance with the unique aircraft identifier code. Various algorithms for encrypting data are known, and one skilled in the art will readily select a particular algorithm that is suitable for encrypting signals for transmission between the aircraft and the automated bridge alignment system. Further optionally, encoding the signals at step 304 includes digitally signing the signal using the unique aircraft identifier code. Optionally, a time-stamp of the time of transmission of the digitally signed signal is added. In the event a bridge collision occurs, the time-stamp data provides information that may be helpful in determining a cause of the collision.

Numerous other embodiments may be envisaged without departing from the spirit and scope of the invention.

What is claimed is:

1. A method for aligning an aircraft-engaging end of a passenger boarding bridge to a doorway of an aircraft, the passenger boarding bridge selected from a plurality of passenger boarding bridges at an airport terminal building and having an aircraft parking space defined adjacent thereto, the method comprising:
   assigning to the aircraft parking space an aircraft having a unique aircraft identifier code associated therewith, the aircraft including a signal-transmitting module for use in automated bridge alignment operations, wherein assigning comprises providing the unique aircraft identifier code to an automated bridge alignment system of the passenger boarding bridge;
   waiting for the aircraft to park within the parking space; and,
   encoding a signal with the unique aircraft identifier code for transmission between the aircraft and the automated bridge alignment system, the encoding comprising digitally signing the signal using the unique aircraft identifier code and time-stamping the signal with a time of transmission of the signal.

2. A method according to claim 1, comprising aligning the aircraft-engaging end of the passenger boarding bridge to the doorway of the aircraft based upon the encoded signal.

3. A method according to claim 2, wherein the encoded signal is a call signal for initiating an automated bridge alignment operation.

4. A method according to claim 2, wherein the encoded signal is a signal for controlling a movement of the passenger boarding bridge.

5. A method according to claim 1, wherein encoding a signal comprises attaching the unique aircraft identifier code to the signal.

6. A method according to claim 1, wherein encoding a signal comprises encrypting the signal using the unique aircraft identifier code as an encryption key.

7. A method according to claim 1, wherein the passenger boarding bridge has a unique bridge identifier code associated therewith, and comprising encoding signals with the unique bridge identifier code for transmission from the automated bridge alignment system to the aircraft.

8. A method for aligning an aircraft-engaging end of a passenger boarding bridge to a doorway of an aircraft, the aircraft having a unique aircraft identifier code associated therewith and including a signal-transmitting module for use in automated bridge alignment operations, the passenger boarding bridge selected from a plurality of passenger boarding bridges at an airport terminal building and having an aircraft parking space defined adjacent thereto, the method comprising:
   retrieving, from a memory element of the airport terminal building, the unique identifier code relating to the aircraft;
   providing the retrieved unique identifier code to an automated bridge alignment system of the passenger boarding bridge;
   using a receiver disposed at a location that is remote from the aircraft, receiving a signal transmitted wirelessly from the aircraft;
   using a processor in communication with the receiver, determining whether the received signal includes information that is indicative of the retrieved unique aircraft identifier code; and,
   in dependence upon the received signal including information that is indicative of the retrieved unique aircraft identifier code, processing the received signal as a signal for aligning the aircraft-engaging end of the passenger boarding bridge to the doorway of the aircraft,
   wherein the received signal is digitally signed using the unique aircraft identifier code and wherein the received signal includes time-stamp information relating to a time of transmission of the signal.

9. A method according to claim 8, wherein the received signal is a call signal for initiating an automated bridge alignment operation.

10. A method according to claim 8, wherein the received signal is a signal for controlling a movement of the passenger boarding bridge.

11. A method according to claim 8, wherein the received signal is a signal that is encoded with the unique aircraft identifier code.

12. A method according to claim 8, wherein the received signal is a signal that is encrypted using the unique aircraft identifier code as an encryption key.

13. A method according to claim 8, wherein the passenger boarding bridge has a unique bridge identifier code associated therewith, and comprising encoding signals with the unique bridge identifier code for transmission from the automated bridge alignment system to the aircraft.

14. A method for aligning an aircraft-engaging end of a passenger boarding bridge to a doorway of an aircraft, the aircraft including a signal-transmitting module for use in automated bridge alignment operations, the passenger boarding bridge selected from a plurality of passenger boarding bridges at an airport terminal building and having an aircraft parking space defined adjacent thereto, the method comprising:

assigning a unique aircraft identifier code to the aircraft;

storing data relating to the unique aircraft identifier code within a memory element of the aircraft, the memory element in communication with the signal-transmitting module;

storing data relating to the unique aircraft identifier code separately within a memory element of the airport terminal building;

assigning the aircraft to park within the aircraft parking space during a current alignment operation, wherein assigning includes providing the unique aircraft identifier code from the memory element of the airport terminal building to an automated bridge alignment system of the passenger boarding bridge;

transmitting a signal from the aircraft to a receiver that is disposed at a location remote from the aircraft, comprising using a processor of the signal-transmitting module for encoding the signal prior to transmitting, wherein encoding the signal comprises digitally signing the signal with the unique aircraft identifier code and time-stamping the encoded signal with a time of transmission thereof;

processing the signal to determine whether it is encoded using the data relating to the unique aircraft identifier code; and, if the signal is encoded using the data relating to the unique aircraft identifier code, performing an action for aligning the aircraft-engaging end of the passenger boarding bridge to the doorway of the aircraft.

15. A method according to claim 14, wherein the signal is a call signal for initiating an automated bridge alignment operation.

16. A method according to claim 14, wherein the signal is a signal for controlling a movement of the passenger boarding bridge.

17. A method according to claim 14, wherein encoding the signal comprises attaching the unique aircraft identifier code to the signal.

18. A method according to claim 14, wherein encoding the signal comprises encrypting the signal using the unique aircraft identifier code as an encryption key.

19. A method according to claim 14, wherein the passenger boarding bridge has a unique bridge identifier code associated therewith, and comprising encoding signals with the unique bridge identifier code for transmission from the automated bridge alignment system to the aircraft.

* * * * *